United States Patent Office 2,899,980
Patented Aug. 18, 1959

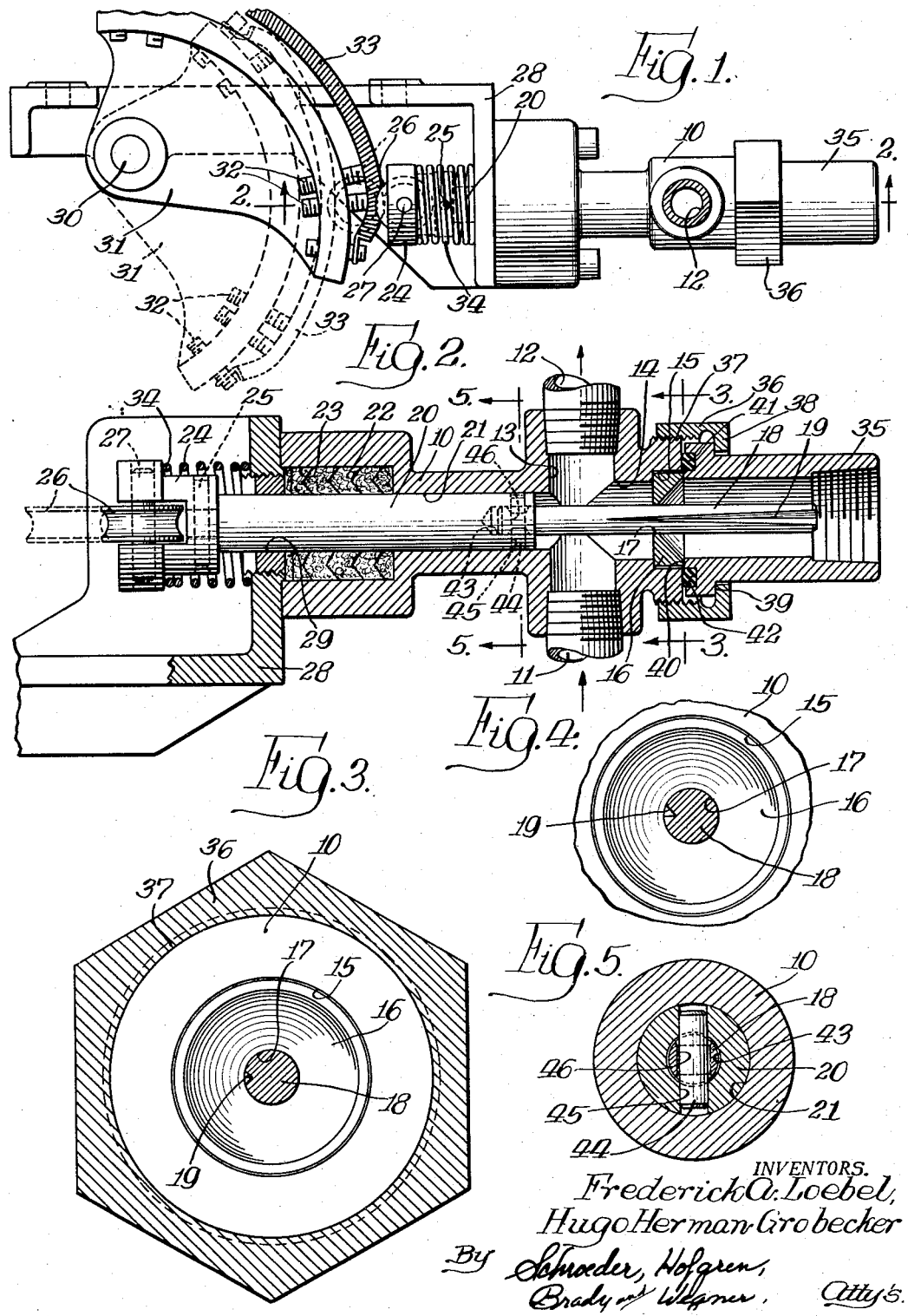

2,899,980

MODULATING VALVE

Frederick A. Loebel and Hugo Herman Grobecker, Milwaukee, Wis., assignors to Cleaver-Brooks Company, a corporation of Wisconsin Application January 20, 1956, Serial No. 560,393

4 Claims. (Cl. 138—46)

This invention relates to a valve and, more particularly, to a modulating valve for accurately controlling the flow of fluid.

The general object of this invention is to provide a new and improved modulating valve.

Another object of this invention is to provide a new and improved modulating valve having a structure providing trouble-free and long service life while permitting a very accurate control of fluid flow through the valve.

Another object of this invention is to provide a fuel modulating valve having an orifice through which a valve stem may slide to change the size of the fuel passage therethrough and which embodies structure permitting the stem to align itself with the orifice.

A still further object of this invention is to provide a modulating valve having cooperating valve parts including an orifice block and a valve stem slidable in the block, both of which are adjustable in position to provide alignment and to avoid wear of the parts.

Other objects and advantages will become apparent from the following detailed description taken in connection with the accompanying drawings, in which:

Fig. 1 is a front elevational view of an embodiment of the invention;

Fig. 2 is an enlarged horizontal sectional view taken generally along line 2—2 of Fig. 1;

Fig. 3 is a vertical sectional view taken generally along line 3—3 of Fig. 2 showing the valve stem in one position;

Fig. 4 is a fragmentary vertical sectional view similar to Fig. 3 showing the valve stem in another position; and Fig. 5 is a vertical sectional view taken generally along line 5—5 of Fig. 2.

While the invention herein described is a preferred embodiment, it is not intended to limit the invention to the specific form and arrangements shown, it being contemplated that various changes may be made by those skilled in the art without departing from the spirit and scope of the appended claims.

The valve of this invention is especially well adapted to accurately control the flow of fuel to a device such as an oil burner.

In the past, one of the principal problems involved with valves having an orifice wherein the passage of fuel therethrough has been accurately controlled by the movement of a valve stem in the orifice has been the short service life of such a valve. It is believed that this problem is due in a large degree to wear of the respective parts caused by a binding action of the valve stem in the orifice resulting from any misalignment of the valve stem in the orifice. This problem has been solved by the valve structure disclosed herein which provides for self-alignment of the valve stem and the orifice resulting in much less wear of the parts and, thus, a substantially increased service life of the valve for accurate fuel control.

Referring to an embodiment of the invention shown in the drawings, and with particular reference to Fig. 2, there is shown a valve body or housing 10 having a fluid inlet 11 and a fluid outlet 12 with a passage 13 extending therebetween to provide for a flow of fluid through the body 10. One end of the valve body 10 has an outlet passage 14 formed therein laterally intersecting the passage 13 at one end and having an annular recess 15 formed in the other end.

An orifice block 16 having an orifice 17 formed therein is adapted to be fitted in the annular recess 15 so as to allow a portion of the fluid flowing through the passage 13 to pass therethrough to a device, such as an oil burner. To accurately control the flow of fluid through the orifice 17, a valve stem 18 is slidably fitted therein having an external slot 19 formed longitudinally thereon which varies progressively in depth along the length of the valve stem 18. The slot 19 defines with the orifice 17 a fluid passage past the orifice block 16 which varies in size with the position of the valve stem 18 in the orifice 17.

Means for controlling the position of the valve stem 18 in the orifice 17 and, thus, the fluid flow therethrough includes a rod 20 slidably movable in a bore 21 formed in the valve body 10, the valve stem 18 being connected to one end of the rod 20 for positive movement with the rod 20 within the valve body 10. The other end of the rod 20 projects externally of the valve body 10 through a packing 22 disposed in a recess 23 formed in the other end of the valve body 10 and has a bifurcated shoe 24 secured to the end thereof by a dowel pin 25.

A cam roller 26 having an external annular groove is rotatably mounted on a pin 27 carried by the shoe 24. A cam mounting member 28 is secured to the end of the valve body 10 over the recess 23 and has a hole 29 provided therein to permit sliding movement of the rod 20 therethrough. Rotatably mounted on a shaft 30 carried on the cam mounting member 28 is a cam member 31 having a series of grooved adjusting screws 32 mounted therein, as best shown in Fig. 1. The cam surface engageable with the cam roller 26 is formed by a coil spring 33 having its ends secured to the two end adjusting screws 32 and its main portion fitted in the grooves formed in the intermediate adjusting screws 32.

With this structure the shape of the cam surface may be varied as desired by merely changing the adjustment of the adjusting screws 32. As the cam member 31 is turned, the rod 20 is slidably moved in the bore 21, the valve stem 18 being connected thereto is thereby moved with respect to the orifice 17 so as to vary the size of the fluid passage through the orifice 17. Two positions of the cam member 31 and the cam roller 26 are shown in Fig. 1, one position of the parts being shown in full line and the other position of the parts being shown in broken line. The difference in the size of the fluid passage through the orifice 17 resulting from these two positions of the cam member 31 is clearly shown by comparing Figs. 3 and 4, the fluid passage shown in Fig. 3 corresponding to the full line position of the cam member 31 and the fluid passage shown in Fig. 4 corresponding to the broken line position of the cam member 31. Resilient means, such as a spring 34, is provided to urge the cam roller 26 against the cam surface at all times and, as shown in Figs. 1 and 2, has one end bearing against the cam mounting member 28 and the other end bearing against a portion of the bifurcated shoe 24.

To hold the orifice block 16 in the annular recess 15, a hollow end cap 35 is adapted to be secured to the end of the valve body 10 by a nut 36 threadably secured to the valve body 10, as at 37. The nut 36 has an annular flange portion 38 engageable with an annular shoulder 39 formed on the end cap 35 to tightly clamp the end cap 35 to the end of the valve body 10.

The outer diameter of the orifice block 16 should be slightly less than the diameter of the annular recess 15 so as to allow the orifice block 16 to align itself in the annular recess 15 when the valve is assembled. In the embodiment shown in the drawings, the clearance provided between the orifice block 16 and the annular recess 15 is .003 inch. The orifice block 16 should also protrude slightly beyond the end of the valve body 10, .003 inch in the embodiment shown, so as to be tightly clamped in the annular recess 15 by an inner annular lip 40 formed on the end cap 35. By providing a good surface finish on the annular lip 40, the orifice block 16 and the annular recess 15, a good metal to metal sealing contact is provided between the mating metal parts. An O-ring 41 disposed in an annular groove 42 formed in the end cap 35 and spaced outwardly from the annular lip 40 provides additional sealing means between the valve body 10 and the end cap 35 to further insure against leakage of fluid.

One of the major problems resulting from such a valve construction where a valve stem such as the valve stem 18 described herein is slidably movable in an orifice is the binding action that may occur between the two parts which results in wear of the parts and, thus, inaccurate control of fluid flow to an oil burner or like device. To overcome this problem we have provided a loose connection between the valve stem 18 and the rod 20 which while providing positive movement of the valve stem 18 with the rod 20, allows lateral or floating movement of the end of the valve stem 18 with respect to the axis of the valve body 10, thus permitting the valve stem 18 to align itself in the orifice 17. We have, thus, provided an accurate fluid flow control valve which requires little maintenance or replacement of parts.

This loose connection between the valve stem 18 and the rod 20 is best shown in Figs. 2 and 5 and includes a longitudinal bore or socket 43 formed in the end of the rod 20 and adapted to loosely receive the end of the valve stem 18, the diameter of the bore 43 being slightly larger than the diameter of the valve stem 18. In the embodiment shown in the drawings, this clearance between the valve stem 18 and the longitudinal bore 43 is .0086 inch. A pin 44 is press fitted in a lateral bore 45 formed in the rod 20 and intersecting the longitudinal bore 43, the pin 44 loosely passing through a lateral bore 46 formed in the end of the valve stem 18. In the embodiment shown, the clearance between the pin 44 and the lateral bore 46 is .0034 inch, the lateral bore 46 being shown countersunk on both ends. It is noted that the clearances shown in Figs. 2 and 5 are exaggerated for purposes of clarity.

In addition to the loose mounting of the valve stem 18 in the rod 20, the present structure insures that the orifice 17 and stem 18 may cooperate without wearing pressures between them. When first assembled, the orifice block 16 may be loosely held in place by the end cap 35 while the stem 18 is reciprocated in the orifice 17. Should any adjustment in the position of the block 16 be required for smooth passage of the stem 18 through the orifice 17, the block 16 may shift in its seat 15 to the limit of the clearance provided. After the end cap 35 is tightened, the block 16 is held between opposed metal surfaces of the housing 10 and cap 35. It may still move laterally, under sufficient pressure, to adjust its position for accommodating the valve stem 18 without binding.

Thus, with the construction shown herein wherein the orifice block 16 is allowed to float or move laterally in the annular recess 15 while the valve is being assembled or after assembly under excessive force, the valve still functions properly should the orifice 17 shift out of alignment with the axis of the rod 20. The valve stem 18 will not bind in the orifice 17 but will align itself in the orifice 17 reducing wear of the parts and allowing the force required to depress the valve stem 18 (in addition to the force required to overcome the action of the spring 34) to be at a minimum.

We claim:

1. A modulating valve, comprising: a housing having a fluid inlet and a fluid outlet and a passage connecting the inlet and outlet, means within the housing in the passage between said inlet and outlet means defining a thin wall having a circular orifice, an elongated cylindrical valve member in the housing mounted with a close sliding fit in said orifice for reciprocal movement therethrough, said valve member having a uniform diameter throughout the portion of its length sliding in said orifice substantially equal the diameter of the orifice and having a slot in one side varying progressively in cross sectional area to define cooperatively with the wall of said orifice a variable sized opening through the orifice for fluid passage, means for operating said valve including a rod substantially aligned with the valve member and reciprocal in the housing, and means for minimizing wear on said valve member and orifice wall comprising a loose connection between said rod and said valve member providing positive sliding movement of said valve member with said rod, preventing relative rotation therebetween, and enabling movement of the valve member relative to the rod in any direction transverse to the axis of the valve member thereby permitting the valve member to align itself and slide freely within the orifice.

2. A modulating valve as defined in claim 1 wherein said loose connection comprises means defining an axial socket in the end of said rod loosely receiving one end of said valve member, a pin fixed in a bore in said rod transversely intersecting said socket and loosely passing through a transversely extending bore formed in the end of said valve member.

3. A modulating valve, comprising; a housing having a fluid inlet and a fluid outlet and a passage connecting the inlet and outlet, means within the housing in the passage between said inlet and outlet means defining a thin walled circular orifice, an elongated cylindrical valve member in the housing mounted with a close sliding fit in said orifice for reciprocal movement therethrough, said valve member having a uniform diameter throughout the portion of its length sliding in said orifice substantially equal the diameter of the orifice and having a slot in one side varying progressively in size to define cooperatively with the wall of said orifice a variable sized opening through the orifice for fluid passage, means for operating said valve including a rod substantially aligned with the valve member and reciprocal in the housing, means forming a loose connection between said rod and said valve member providing positive sliding movement of said valve member with said rod, preventing relative rotation therebetween, and enabling movement of the valve member relative to the rod in any direction transverse to the axis of the valve member thereby permitting the valve member to align itself and slide freely within the orifice, said means defining said orifice comprising a cylindrical orifice block, an annular recess formed in said housing concentrically with said passage and receiving said orifice block, means for clamping said block axially against the bottom of said annular recess, said orifice block having an outer diameter less than the diameter of said annular recess to provide an annular clearance between the periphery of the block and the periphery of the recess enabling adjustment of said block in said recess within the limits of said annular clearance before the block is clamped, and enabling lateral movement of the block under excessive force after clamping.

4. A modulating valve as defined in claim 3, wherein the means for clamping said orifice block comprises a hollow end cap positionable adjacent said housing and having an inner annular lip positionable concentrically against the outer surface of said block to clamp the latter axially against the bottom of said annular recess and provide a metal to metal sealing contact with the outer face of the block in a plane normal to the axis of the block, a sealing ring disposed concentrically outwardly of said metal to metal sealing contact, between said end cap and said housing, thereby providing a double seal, and a flanged nut on said end cap threadable on said housing for drawing the end cap toward the housing.

References Cited in the file of this patent

UNITED STATES PATENTS

| | | | |
|---|---|---|---|
| Re. 17,022 | Wilson | July 3, | 1928 |
| 726,395 | Bedworth | Apr. 28, | 1903 |
| 1,284,063 | Davis | Nov. 5, | 1918 |
| 1,579,600 | Durante | Apr. 6, | 1926 |
| 1,653,369 | Murphy | Dec. 20, | 1927 |
| 1,824,716 | Gibbons | Sept. 22, | 1931 |
| 1,825,864 | Harter | Oct. 6, | 1931 |
| 1,859,834 | May | May 24, | 1932 |
| 1,886,159 | Brown | Nov. 1, | 1932 |
| 2,069,297 | Abercrombie | Feb. 2, | 1937 |
| 2,230,093 | Tate | Jan. 28, | 1941 |
| 2,330,610 | Natter | Sept. 28, | 1943 |
| 2,466,946 | Groom | Apr. 12, | 1949 |
| 2,618,457 | Davidson | Nov. 18, | 1952 |
| 2,790,460 | Radd | Apr. 30, | 1957 |